Figure 1:
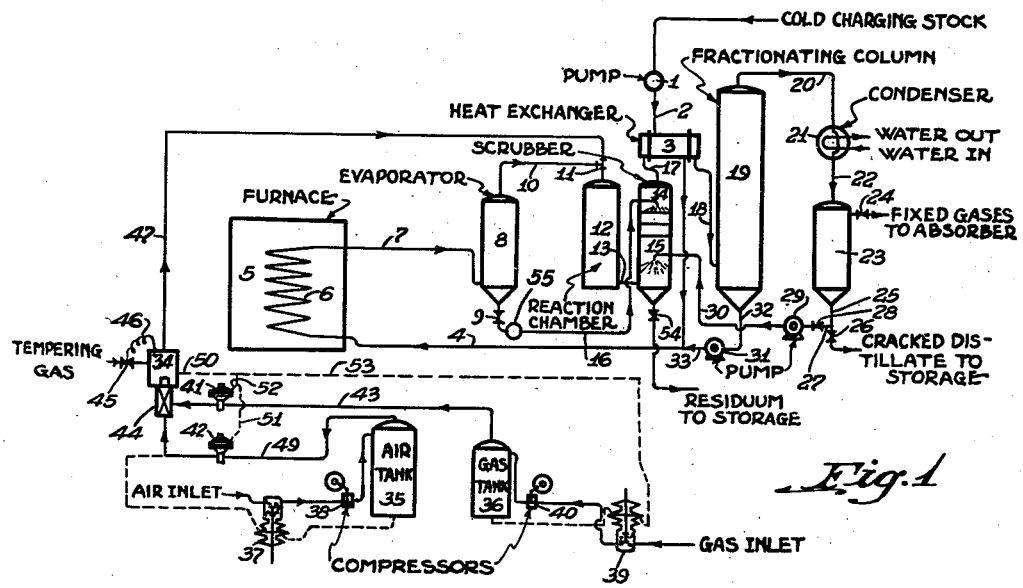
Figure 2:
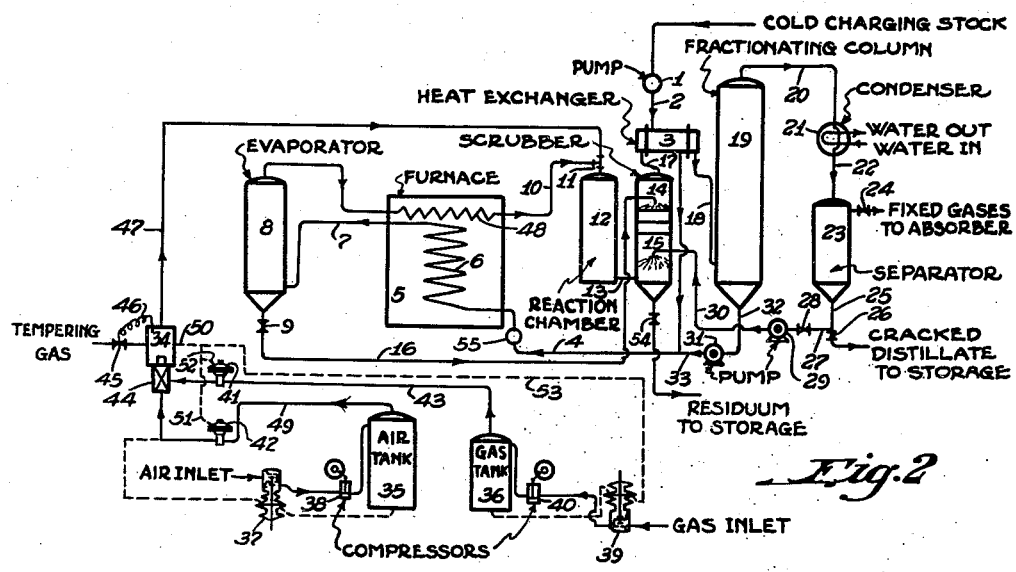

Feb. 10, 1942. W. O. KEELING 2,272,209
PROCESS FOR THE THERMAL TREATMENT OF HYDROCARBONS
Filed June 18, 1937

INVENTOR.

William O. Keeling

Patented Feb. 10, 1942

2,272,209

UNITED STATES PATENT OFFICE 2,272,209

PROCESS FOR THE THERMAL TREATMENT OF HYDROCARBONS

William O. Keeling, Pittsburgh, Pa.

Application June 18, 1937, Serial No. 148,925

2 Claims. (Cl. 196—67)

My invention relates to a vapor-phase process for converting hydrocarbons from one form or composition to another form or composition having more desirable properties by means of a thermal treatment, and more particularly to a process in which at least a portion of the heat required is supplied by direct admixture of the hydrocarbon vapors with a suitable heat-carrier gas.

This application is an improvement on my co-pending application Serial No. 369,175, now U. S. Patent 2,085,027, in which is disclosed the steps of vaporizing an oil to be converted, mixing the evolved vapors with a heat carrier gas in a mixing chamber to insure instantaneous admixing of the vapors and the gas and then expanding the mixture into an enlarged reaction zone to provide an adequate time interval for the conversion reaction to be completed, and is a continuation-in-part of application 597,692 in which was disclosed the steps of vaporizing the oil to be converted, separating the evolved vapors from any unvaporized residue, further heating the evolved vapors by indirect heat exchange, mixing the heated vapors with a heat carrier in a mixing chamber to secure instantaneous mixing and then expanding the mixture into an enlarged space to provide an adequate time interval for the conversion reaction to be completed, separately generating hot gases of combustion by any suitable means and reducing the temperature of the hot combustion gases so produced by mixing them with a cooler gas prior to admixture of the tempered combustion gases with the heated vapors.

One object of my invention is to provide a process in which the heat-carrier gas used can be combustion gases of uniform composition and temperature. Uniform composition can only be obtained by continuously proportioning the air and fuel supplied to a combustion zone. Combustion gases at flame temperatures cannot be directly admixed with hydrocarbon vapors without decomposition of excessive amounts of the latter to fixed gases or even to hydrogen and carbon. Hence, the temperature of the combustion gases should be decreased, in most cases, prior to admixture with the hydrocarbons to be converted.

I have found it advantageous to generate the combustion gases in a zone, separate from and independent of the remainder of the conversion system, and to automatically regulate the quantities and proportions of air and fuel supplied to this separate combustion zone by the pressure carried within the conversion system. One method of attaining these objectives and suitable control mechanisms has been described in my U. S. Patents Nos. 1,971,073 and 1,991,750.

I have also found it advantageous to reduce the temperature of the combustion gases, after combustion has been completed, by directly admixing with them sufficient quantities of any suitable cooler gas to result in the mixture having the desired temperature for admixing with the hydrocarbon vapors. To insure a uniform temperature of the mixed gases, I pass the cooling gases through a throttle valve and control the quantity passing therethrough by means of a pyrometer placed in the stream of mixed gases at some suitable point, prior to admixing the cooled or tempered heat-carrier gas with the oil vapors to be converted.

Another object of my invention is to provide a conversion process of such flexibility that it can be used for converting any type of hydrocarbon from the least stable, thermally, to methane, the most stable, and yet keep the quantities of heat-carrier gas required to an absolute minimum. This is accomplished by imparting a substantial portion of the heat required to the hydrocarbons by means of indirect heat exchange with combustion gases and supplying only the remainder of the heat required by direct admixture of the resulting hydrocarbon vapors with fresh combustion gases, formed in a zone separate from and independent of the indirect heating zone, in quantities and at a temperature sufficient to complete the desired conversion. This procedure is described in my co-pending application Serial No. 597,692.

Another object of my invention is to provide a conversion process, as above described, in which the reaction time is rigidly controlled so that the conversions desired are substantially completed, yet no time is allowed for the development of undesired side reactions. This is accomplished by thoroughly mixing the partly heated hydrocarbon vapors with the heat-carrier gas in a suitable mixing chamber through a time interval insufficient to permit a substantial degree of conversion and then expanding the mixture into a reaction chamber of such volumetric capacity as to provide a predetermined reaction time. This procedure is described in my co-pending applications Serial Nos. 369,175, now U. S. Patent 2,085,027, and 597,692.

Another object of my invention is to provide a conversion process, as above described, in which the formation of undesired side-reaction products is prevented by suddenly cooling the conversion products when the desired degree of conversion has been completed and before a substantial amount of undesired side-reaction products is formed. This step is old in the art, particularly the injection of all, or a portion, of the fresh charging stock or water. I have found an excellent quenching medium to be a portion of the light, previously-formed distillate.

I have appended to this specification, a drawing, in which

Figure I presents a schematic flow diagram of one modification of the process in which substantially all of the heat of conversion is supplied by the heat-carrier gases; and Figure II presents a schematic flow diagram of another modification of the process in which the heat-carrier gases only supply a portion of the heat of conversion.

Referring to Figure I, the cold charging stock is picked up by pump 1 and forced through pipe 2 into heat exchanger 3, in which it picks up sensible heat by indirect heat exchange with the hot reaction products from scrubber 14 and travels thence through pipe 4 to pipe still 5 in which it is further heated to, or above, its vaporizing temperature in vaporizer coil 6. The highly-heated charging stock leaves the pipe still through pipe 7, entering evaporator 8 where the vaporizable portions are "flashed" into vapors. Any unvaporizable portions fall to the bottom of the evaporator and are withdrawn through valve 9.

The evolved vapors leave the evaporator through pipe 10 and pass into mixing chamber 11, in which they are instantaneously admixed with the heat-carrier gas and the mixture is then expanded into reaction chamber 12 to provide the proper time interval for completing the desired conversion reactions.

When the desired conversion is completed, the reaction products leave the chamber through pipe 13 and enter scrubber 14 in which their temperature is suddenly reduced by a spray of light liquid through spray nozzle 15. If very extensive conversion is being practiced, the partially-cooled conversion products may be scrubbed, to remove any cracked tars or lampblack, by means of the residuum withdrawn from evaporator 8 through valve 9 and forced to the scrubber through pipe 16, by pump 55.

The partially-cooled conversion products leave the scrubber through pipe 17 and pass through heat exchanger 3 in which they give up a portion of their contained heat by indirect heat exchange with cold, incoming charging stock.

They leave the exchanger through pipe 18 and enter the fractionating column 19 in which fixed gases and products boiling under a desired temperature are separated from the products boiling above the desired temperature by fractionation.

The fixed gases and low-boiling portion of the conversion products leave the fractionating column through pipe 20, passing through condenser 21 in which the distillate is condensed. The fixed gases and condensate leave the condenser through pipe 22, passing into the gas separator 23 in which the condensate and fixed gases are separated.

The fixed gases leave the separator through valve 24, which controls the pressure in the whole conversion system, and may be disposed of as desired, or if the lightest ends of the condensate, carried out of the system with these gases, are of sufficient value, they may be recovered by passing these fixed gases through a standard absorption plant, not shown.

The condensate is withdrawn from the separator through pipe 25 and valve 26 and is sent to storage or is otherwise disposed of. A portion of the condensate, used for quenching, is withdrawn from pipe 25 through pipe 27 and valve 28 and is forced by pump 29 through pipe 30 into the spray nozzle 15 in the scrubber.

The high-boiling portions of the conversion products collect in the bottom of the fractionating column and are withdrawn by pump 31 through pipe 32 and forced through pipe 33 into the stream of fresh charging stock in pipe 4 and passes again through the system with the fresh charging stock for further conversion.

The straight run residuum used for scrubbing picks up any lampblack and cracked tar and falls to the bottom of the scrubber 14 and is withdrawn from the system through valve 54 to storage.

The combustion gases, used as a heat carrier, are generated in a separate burner 34. Although any type of a burner suitable for the purpose may be used, I prefer to use a surface combustion type of burner and a gaseous fuel. With this type of burner, the air and fuel are premixed in an inspirator in the desired proportions and the mixture is discharged into the combustion zone. Either the air or gas may be used as the inspirating medium to draw the other into the inspirator, depending upon the type of fuel gas used. For natural gas I use air for the inspirating medium. Full details of the apparatus used in generating and tempering the combustion gases have been disclosed in U. S. Patent No. 1,971,073 and will not be repeated here. The method of operation will be repeated in order that a clear understanding may be had of its use in conjunction with the process as a whole.

Air for combustion is compressed and stored in container 35. The pressure maintained in this container is greater than the pressure maintained in the conversion system by an amount necessary to force the air from the container through the inspirator to draw in the fuel gas, and discharge the air-fuel mixture to the combustion zone. This pressure differential is maintained by a suitable loading of the diaphragm-type throttle valve 42 placed in pipe 49 between the air receiver and inspirator 44.

Fuel gas is compressed and stored in container 36. The pressure maintained in this container is substantially the same as the pressure maintained in the conversion system.

Air is drawn through valve 37 by compressor 38 and discharged into container 35. As long as the pressure in this container remains at a constant differential above that maintained in the conversion system this intake valve 37 remains open. As soon as pressure in this container begins to exceed the proper differential pressure, the diaphragm begins to close the valve so that the air supply is reduced or even closed off. As soon as the pressure in the receiver drops to the proper differential pressure the valve begins to open up. In this fashion the air supply in the container is maintained constant and at a constant pressure.

Fuel gas is drawn through a diaphragm-type valve 39 by compressor 40 and discharged into container 36. Pressure is maintained constant at substantially conversion system pressure by means of a diaphragm-type throttle valve 41 placed in the gas line 43 between the container and the inspirator. If the pressure in the container builds up above system pressure, the intake valve 39 closes, shutting off the gas supply. If the pressure in the container falls below system pressure the intake valve 39 is opened wider so that more gas may be drawn in by the compressor.

By thus maintaining the air and gas supplies at constant pressures and by use of a proper sized orifice in the gas line at the inspirator, the air-fuel mixture supplied to the burner is constantly proportioned, regardless of any pressure change in the conversion system. Hence the combustion gases formed will have a constant composition regardless of any pressure change in the conversion system. System pressure is communicated to the control valves through pipe 50 and its branches 51, 52, and 53.

The air-fuel mixture is discharged by the inspirator 44 into the burner 34, which is a suitable container lined with refractories and well insulated to prevent heat losses. Combustion in this burner is very rapid, being catalyzed by radiation from the incandescent refractory lining. As soon as combustion is completed, cooler tempering gases are introduced into the path of the combustion products through throttle valve 45. The operating mechanism of this valve is controlled by a thermo-couple 46 placed in the path of the tempered heat-carrier gas so that it will admit only the amount of cooling gas necessary to result in a mixed gas temperature for which the valve mechanism is set. By having an adequate supply of cooling gases, the temperature of the heat-carrier mixture will be constant, regardless of the amount of combustion gases generated.

The tempered combustion gases leave the burner through pipe 47 and discharge into mixing chamber 11, where they are instantly commingled with the hydrocarbon vapors to be converted and pass through the remainder of the system with the hydrocarbon vapors.

It can be seen that for any given conversion system pressure a constant supply of heat-carrier gas at a constant temperature will be supplied to the mixing zone. If it is desired to increase the cracking capacity of the unit, all that is necessary is to close down on the pressure control valve 24 so that the pressure in the system will build up to the desired point. At the higher pressures, obviously, larger amounts of oil vapors will be contained in the system, requiring a large supply of heat-carrier gas, and this supply is automatically increased by the control mechanisms, but at a constant temperature. Conversely, if decreased capacity is desired, all that is required is to decrease the system pressure by further opening valve 24, and all adjustments in the heat-carrier gas supply are automatically provided.

The chemical nature of the heat-carrier gases can be oxidizing, reducing, or neutral, as desired. For maximum thermal efficiency, the combustion gases should be neutral, i. e., combustion should be perfect. In this case, if an oxidizing atmosphere is desired, controlled amounts of air or oxygen may be introduced with the cooling gases. If a reducing atmosphere is desired, a reducing agent, such as carbon monoxide, may be introduced with the cooling gas. If a neutral atmosphere is desired, obviously, the cooling gas must be neutral.

If maximum thermal efficiency is not of prime importance, excess air or oxygen may be introduced into the burner as part of the air-fuel mixture. If a reducing atmosphere is desired, it is only necessary to adjust the inspirator so that there is a constant deficiency in the air supply, making perfect combustion impossible. This condition results in the formation of carbon monoxide and makes unnecessary an outside supply of the reducing agent.

Referring to Figure II, this modification of my invention is identical with that shown and described under Figure I, except for the inclusion of a vapor-phase cracking coil in the pipe still, by means of which a portion of the heat of conversion is applied to the hydrocarbon vapors by indirect heat exchange, thereby reducing to an absolute minimum the quantity of heat-carrier gases required to complete the desired conversion.

In this second modification of my process, the vapors leave evaporator 8 and enter the vapor-phase cracking coil 48 located in pipe still 5, in which they are heated to a temperature for sufficient time to insure partial conversion. The partially converted vapors leave the cracking coil through pipe 10 and pass into mixing chamber 11.

For further details of this modification, see the description for the modification shown in Figure I.

It will be obvious to those skilled in the art that my invention is of utility and, with suitable modifications in design and apparatus, can be used for cracking high-boiling hydrocarbons to motor fuel, aromatics, olefines, or fuel gas; for polymerization or dehydrogenation of low-boiling hydrocarbons; for limited oxidation, chlorination, etc. The foregoing descriptions are merely illustrative of two modifications of my invention suitable for cracking, and it is to be understood that any of various changes and alternative arrangements, necessary to adapt it for the various uses herein set forth, may be made within the scope of the appended claims, in which it is my intention to claim all novelty inherent in the invention as broadly as the prior art permits.

I claim as my invention:

1. A process for treating hydrocarbons, comprising the steps of vaporizing hydrocarbons, separating the evolved vapors from any unvaporized fractions remaining, generating combustion gases to be used as the heat carrier gas in a separate zone, and automatically insuring that said combustion gases are of uniform quantity and composition through suitable automatic regulation of the air and fuel supplied to the combustion zone by the pressure carried in the treating system, cooling the combustion gases to a predetermined temperature by admixing therewith a suitable cooler gas and automatically controlling the temperature of the mixed gases through regulating the amount of cooling gas added by a thermostatically-controlled valve having an actuating thermocouple placed in the mixed gas stream at a point prior to admixture with the hydrocarbon vapors, including the additional step of introducing, into the heat carrier gas, reducing reagents capable of chemically reacting with any oxygenated compounds of the hydrocarbons undergoing treatment.

2. A process for treating hydrocarbons, consisting of the steps of vaporizing the hydrocarbons, separating the evolved vapors from any unvaporized fractions remaining, heating the evolved vapors by indirect heat exchange, generating combustion gases to be used as the heat carrier gas in a separate zone and automatically insuring that said combustion gases are of uniform quantity and composition through suitable automatic regulation of the air and fuel supplied to the combustion zone by the pressure carried in the treating system, cooling the combustion gases to a predetermined temperature by admixing therewith a suitable cooler gas and automatically controlling the temperature of the mixed gases through regulating the amount of cooling gas added by a thermostatically-controlled valve having an actuating thermo-couple placed in the mixed gas stream at a point prior to admixture with the hydrocarbon vapors, directly admixing the hydrocarbons with the tempered combustion gases in a mixing chamber, and then expanding the resulting mixture into an enlarged space to provide a suitable reaction time, including the additional step of introducing, into the heat carrier gas, reducing reagents capable of chemically reacting with oxygenated compounds of the hydrocarbons undergoing treatment.

WILLIAM O. KEELING.